United States Patent
Toyonaga

(10) Patent No.: US 7,274,968 B1
(45) Date of Patent: Sep. 25, 2007

(54) METHOD OF SERIAL COMMUNICATION METHOD BETWEEN NC DEVICE AND A PLURALITY OF SERVO AMPS FOR SERVOMOTORS

(75) Inventor: Tatsuo Toyonaga, San Jose, CA (US)

(73) Assignees: Sodick Co., Ltd., Yokohama (JP); Sodick America Corporation, San Jose, CA (US)

( * ) Notice: Subject to any disclaimer, the term of this patent is extended or adjusted under 35 U.S.C. 154(b) by 0 days.

(21) Appl. No.: 11/645,033

(22) Filed: Dec. 26, 2006

(51) Int. Cl.
*G06F 19/00* (2006.01)

(52) U.S. Cl. .................. 700/169; 700/173; 700/19; 318/569

(58) Field of Classification Search ............... 700/19, 700/20, 23, 67, 69, 159, 169, 173; 318/34, 318/560, 569, 600
See application file for complete search history.

(56) References Cited

U.S. PATENT DOCUMENTS

| | | | | |
|---|---|---|---|---|
| 5,268,898 | A * | 12/1993 | Kazato | 318/562 |
| 5,361,260 | A * | 11/1994 | Mito | 370/460 |
| 5,555,178 | A * | 9/1996 | Hashimoto | 700/175 |
| 5,946,215 | A * | 8/1999 | Mito | 700/169 |
| 5,990,638 | A * | 11/1999 | Aoyama et al. | 700/169 |
| 6,442,444 | B2 * | 8/2002 | Matsubara et al. | 700/95 |
| 6,806,660 | B2 | 10/2004 | Fujisaki et al. | |
| 7,038,418 | B2 | 5/2006 | Noda et al. | |
| 7,119,505 | B2 * | 10/2006 | Komaki et al. | 318/569 |
| 2007/0046238 | A1 * | 3/2007 | Xu | 318/571 |

FOREIGN PATENT DOCUMENTS

| | | |
|---|---|---|
| JP | 9-54609 | 2/1997 |
| JP | 2001-147706 | 5/2001 |

* cited by examiner

*Primary Examiner*—Leo Picard
*Assistant Examiner*—Charles Kasenge
(74) *Attorney, Agent, or Firm*—McDermott Will & Emery LLP

(57) ABSTRACT

A communication control system and method of communicating between a numerical control device and a plurality of servomotors, includes connecting the numerical control device to a plurality of servoamps of the plurality of servomotors in a loop configuration via bi-directional serial communication cables, splitting command data in the numerical control device, outputting a first portion of command data to one of the plurality of servoamps from the numerical control device in a counter-clockwise direction and a second portion of command data to one of the plurality of servoamps from the numerical control device in a clockwise direction, splitting feedback data in one of the plurality of servoamps, transmitting a first portion of feedback data to the numerical control device in a counter-clockwise direction from the one of plurality of servoamps in response to the first portion of command data, and transmitting a second portion of data to the numerical control device from the one of the plurality of servoamps in a clockwise direction in response to the second portion of command data, whereby splitting command data and feedback data and transmitting the split portion of data in clockwise and counter-clockwise directions to a servoamp reduces total transmission time.

7 Claims, 4 Drawing Sheets

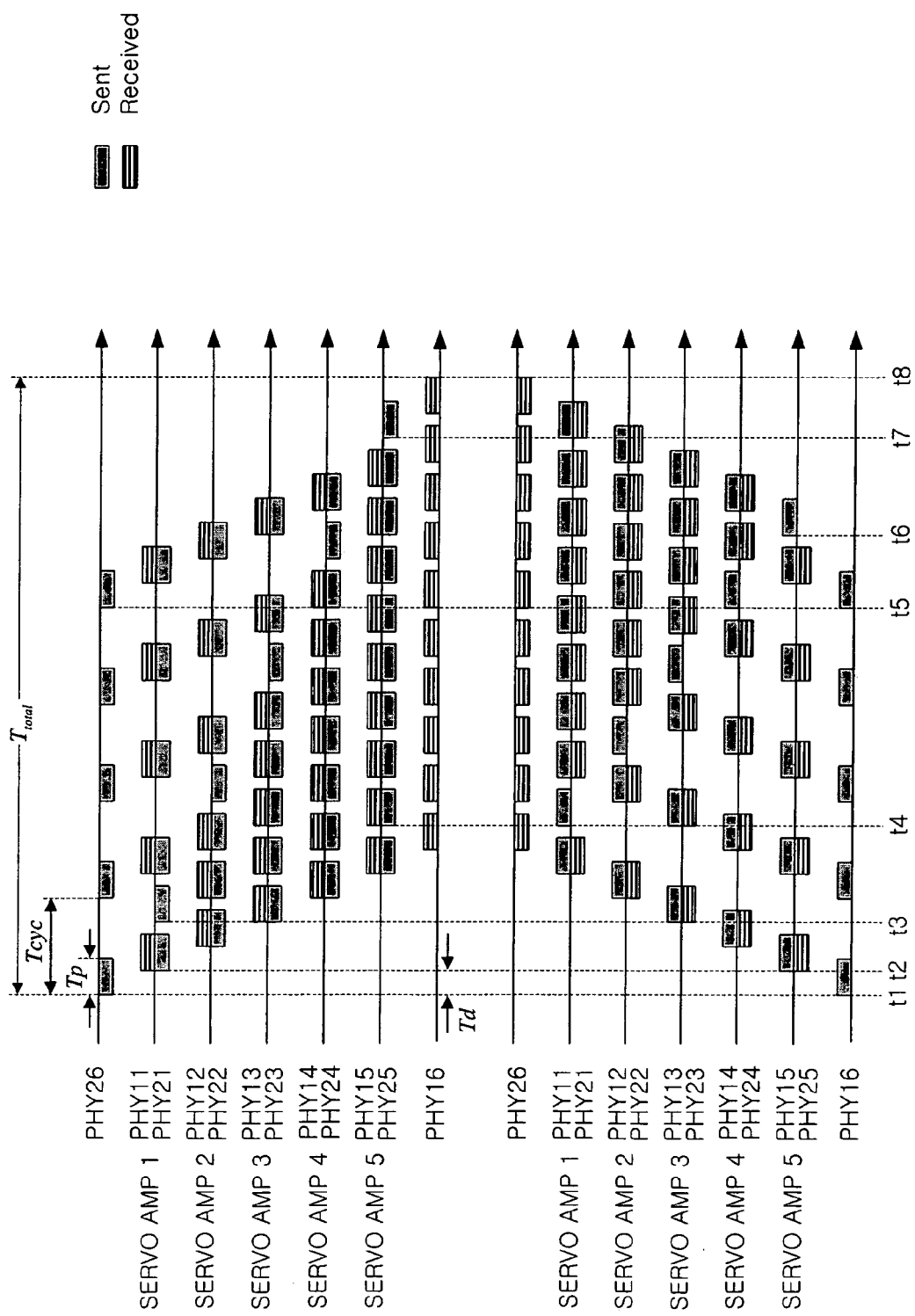

METHOD OF SERIAL COMMUNICATION METHOD BETWEEN NC DEVICE AND A PLURALITY OF SERVO AMPS FOR SERVOMOTORS

FIELD OF THE INVENTION

The present invention relates to a servomotor control system for controlling a plurality of servomotors. In particular, the present invention relates to a serial communication which is implemented between an NC device and a plurality of servo amps for servomotors.

DESCRIPTION OF THE PRIOR ART

As shown in FIG. 1, a machine tool such as electric discharge machine and machining center is provided with a plurality of servomotors 51, 52, 53, 54 and 55 for moving an object in respective axial directions, a plurality of servo amps 1, 2, 3, 4 and 5 for driving respective servomotors, and a numerical control ("NC") device 6 for providing position, velocity or current command to each servo amp. The object is, for example, a tool attached to a head, or a workpiece fixed to a table. The NC device 6 analyzes NC codes to obtain information on a path along which the object will move. The NC device 6 generates position commands for the plurality of servomotors 51, 52, 53, 54 and 55 based on the path information. The position command is compared to a position feedback to generate a velocity command. A current command is generated by comparing the velocity command to a velocity feedback. Each servo amp 1, 2, 3, 4 and 5 supplies current to servomotor 51, 52, 53, 54 and 55 according to an error between the current command and a current feedback. The NC device 6 is physically separate from the servo amps. In most machine tools, the current control loops are included in respective servo amps. The position control loops and velocity control loops may be included in the NC device 6 or respective servo amps. In general, the servo amps 1, 2, 3, 4 and 5 are connected to the NC device 6 in a daisy chain configuration with bidirectional serial communication cables 41, 42, 43, 44 and 45 to reduce the amount of wires. Such daisy chain configuration is disclosed in U.S. Pat. No. 6,806,660 and Japanese laid-open patent publication Nos. 9-54609 and 2004-252527. A serial bus controller of the NC device 6 acts as a host and serial bus controllers of the servo amps 1, 2, 3, 4 and 5 operate as targets. With increasing demand being made upon positioning accuracy and feed rate of machine tools, loop execution frequencies of position control loop, velocity control loop and current control loop become ever greater to more than 50 KHz. In order to meet such high loop execution frequency, bit rate of from several hundred Mbps (megabit per second) to a Gbps (gigabit per second) in a serial bus is needed. Physical layers which are encompassed in Gigabit Ethernet such as 1000Base-T or 1000Base-SX are used to send and receive data in the servomotor control system of FIG. 1. A physical layer 26 is attached to the NC device 6 and pairs of physical layers 11, 21, 12, 22, 13, 23, 14, 24, 15 and 25 are attached to respective servo amps 1, 2, 3, 4 and 5. The physical layer 26 of the NC device 6 is connected to the physical layer 11 of the first servo amp 1 by a serial communication cable 41. The physical layer 21 of the first servo amp 1 is connected to the physical layer 12 of the second servo amp 2 by a serial communication cable 42. The physical layer 22 of the second servo amp 2 is connected to the physical layer 13 of the third servo amp 3 by a serial communication cable 43. Thus, each physical layer 11, 12, 13, 14 and 15 provides communication with the former node and each physical layer 26, 21, 22, 23 and 24 provides communication with the latter node. The physical layer 25 of the last servo amp 5 is not connected to any node.

FIG. 2 illustrates a serial communication in which the physical layer 26 of the NC device 6 sends a 64 byte command data packet for position, velocity or current to each servo amp 1, 2, 3, 4 and 5, and each servo amp 1, 2, 3, 4 and 5 sends a 64 byte feedback data packet for reply to the NC device 6. At time t1, the physical layer 26 of the NC device 6 starts to send a first command data packet to the first servo amp 1. The first command data packet is addressed to the first servo amp 1. After a delay of physical layer Td, the physical layer 11 of the first servo amp 1 starts to receive the first command data packet at time t2. After the physical layer 11 completes to receive the first command data packet and identifies an address, the physical layer 11 of the first servo amp 1 starts to send a first feedback data packet to the NC device 6 at time t3. The feedback data includes an acknowledgement and data representative of an error in servomotors such as overpower and overheat. If the NC device 6 includes position control loops and velocity control loops, the feedback data may further include position feedback data and velocity feedback data. After the physical layer 26 completes to receive the first feedback data packet, it starts to send a second command data packet to the first servo amp 1 at time t4. The second command data packet is addressed to the second servo amp 2. After the physical layer 12 of the second servo amp 2 completes to receive the second command data packet and identifies an address, at time t5, the physical layer 12 of the second servo amp 2 starts to send a second feedback data packet to the first servo amp 1. The second feedback data packet is sent to the NC device 6 through first servo amp 1. At time t6, the physical layer 26 sends the last command data packet to the first servo amp 1. The last command data packet is addressed to the last servo amp 5. After the physical layer 15 of the last servo amp 5 completes to receive the last command data packet and identifies an address, the physical layer 15 of the last servo amp 5 starts to send the last feedback data packet to the fourth servo amp 4, at time t7. The last feedback data is sent to the NC device 6 through the first, second, third and fourth servo amps 1, 2, 3 and 4. At time t8, the physical layer 26 completes to receive the last feedback data packet. A total transmission time $T_{total}$ during which the servo amps 1, 2, 3, 4 and 5 complete to receive respective command data packet and the NC device 6 completes to receive feedback data packets from the servo amps 1, 2, 3, 4 and 5 is represented by the following equation:

$$T_{total} = \sum_{0}^{n} n \times 2 \times Td + n \times 2 \times Tp \qquad (1)$$

where n is a number of the servo amps, Td is a delay of physical layer, Tp is a time length of a 64 byte packet. The delay Td mainly includes analog-to-digital and digital-to-analog conversion in a physical layer of a gigabit Ethernet 1000Base-T, or photoelectric conversion in a physical layer of a fiber optic gigabit Ethernet 1000Base-SX. In either case, the delay Td is about 500 ns. As the gigabit Ethernet can transmit data at a rate of gigabit per second, Tp is 512 ns. Therefore, a total transmission time $T_{total}$ is about 20.12 µs. Actually, it is not seemed that the servomotor control system of FIG. 1 can maintain about 20.12 µs of a total transmission time as additional time for retransmission due to communication fault factors into calculation. The higher bit rate, the greater influence a delay of physical layer has on the total transmission time.

SUMMARY OF THE INVENTION

An object of the invention is to provide a method of implementing serial communication between an NC device and a plurality of servo amps with reduced total transmission time without data collision and excessive increase of the amount of wires.

According to one aspect of the present invention, a method of implementing serial communication between an NC device and a plurality of servo amps for servomotors includes the steps of:

connecting the NC device to the plurality of servo amps in a loop configuration by bidirectional serial communication cables;

splitting command data into halves in the NC device;

sending a first half packet of command data to one of the plurality of servo amps from the NC device in a counterclockwise direction and a second half packet of command data to the one of the plurality of servo amps from the NC device in a clockwise direction at the same time;

splitting feedback data into halves in the one of the plurality of servo amps;

sending a first half packet of feedback data to the NC device in a counterclockwise direction from the one of the plurality of servo amps in response to the first half packet of command data; and sending a second half packet of feedback data to the NC device from the one of the plurality of servo amps in a clockwise direction in response to the second half packet of command data.

The command data may be one of position command data, velocity command data and current command data.

Other novel features of the invention will be described in the following description.

BRIEF DESCRIPTION OF THE DRAWINGS

FIG. 4 is a timing chart illustrating a serial communication method of the present invention.

PREFERRED EMBODIMENT OF THE INVENTION

An exemplary embodiment of a method of implementing serial communication will now be described with reference to drawings.

Figure 1:
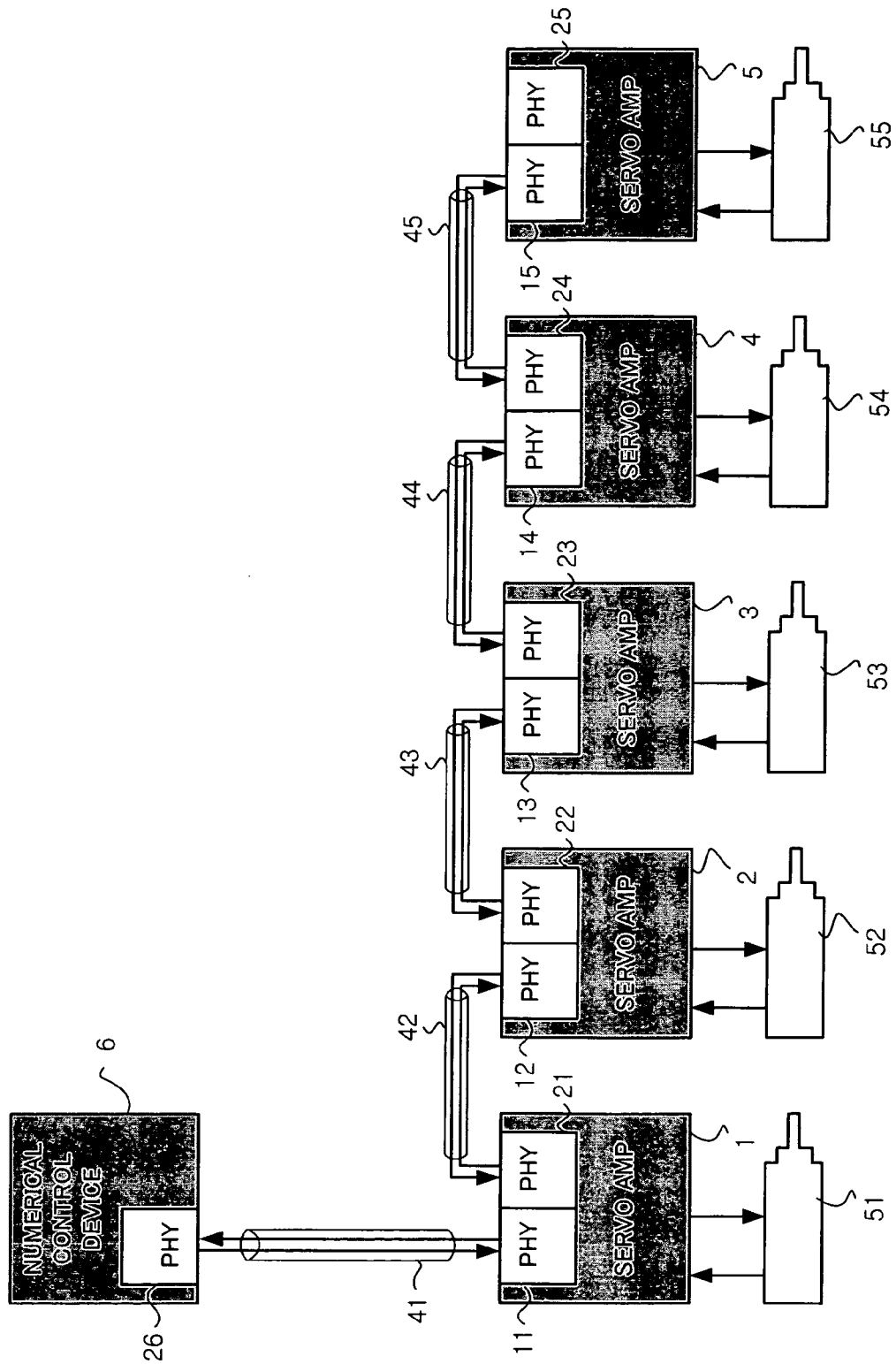
FIG. 1 is a block diagram illustrating a servomotor control system of prior art.
Figure 2:
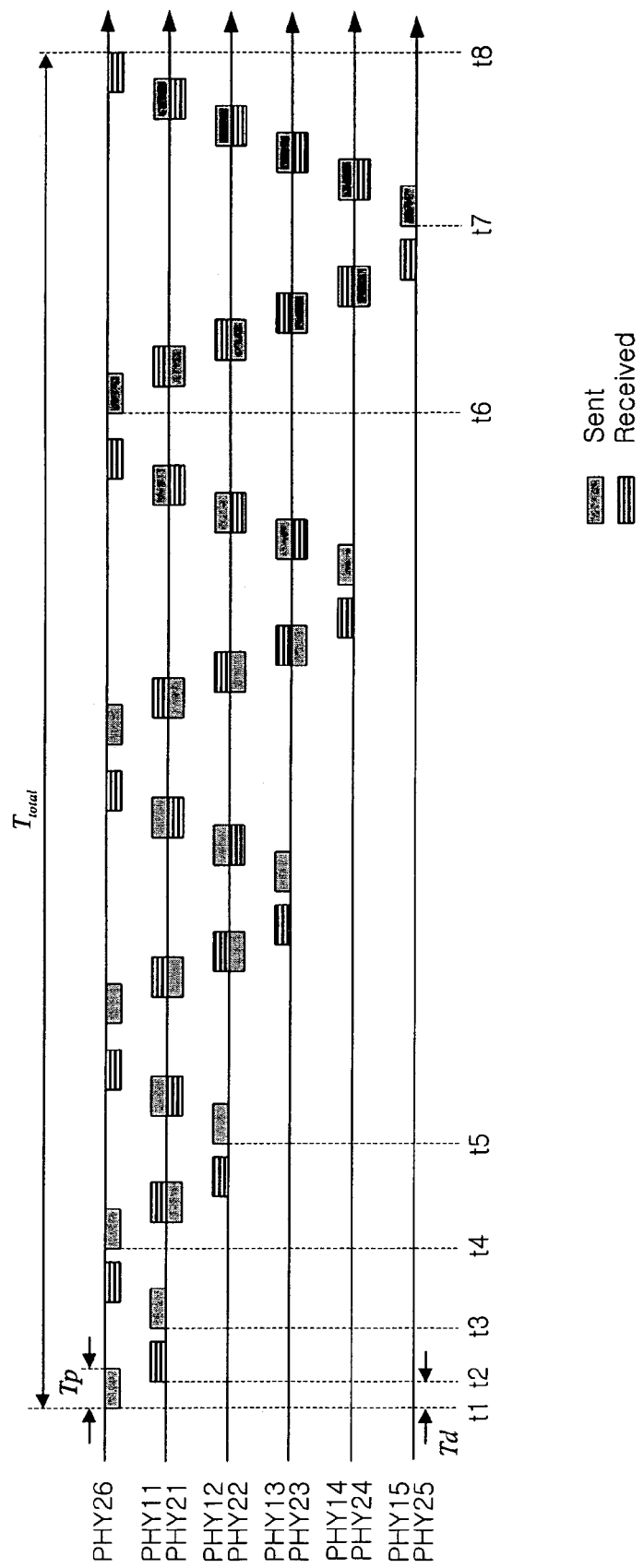
FIG. 2 is a timing chart illustrating a serial communication method of prior art.
Figure 3:
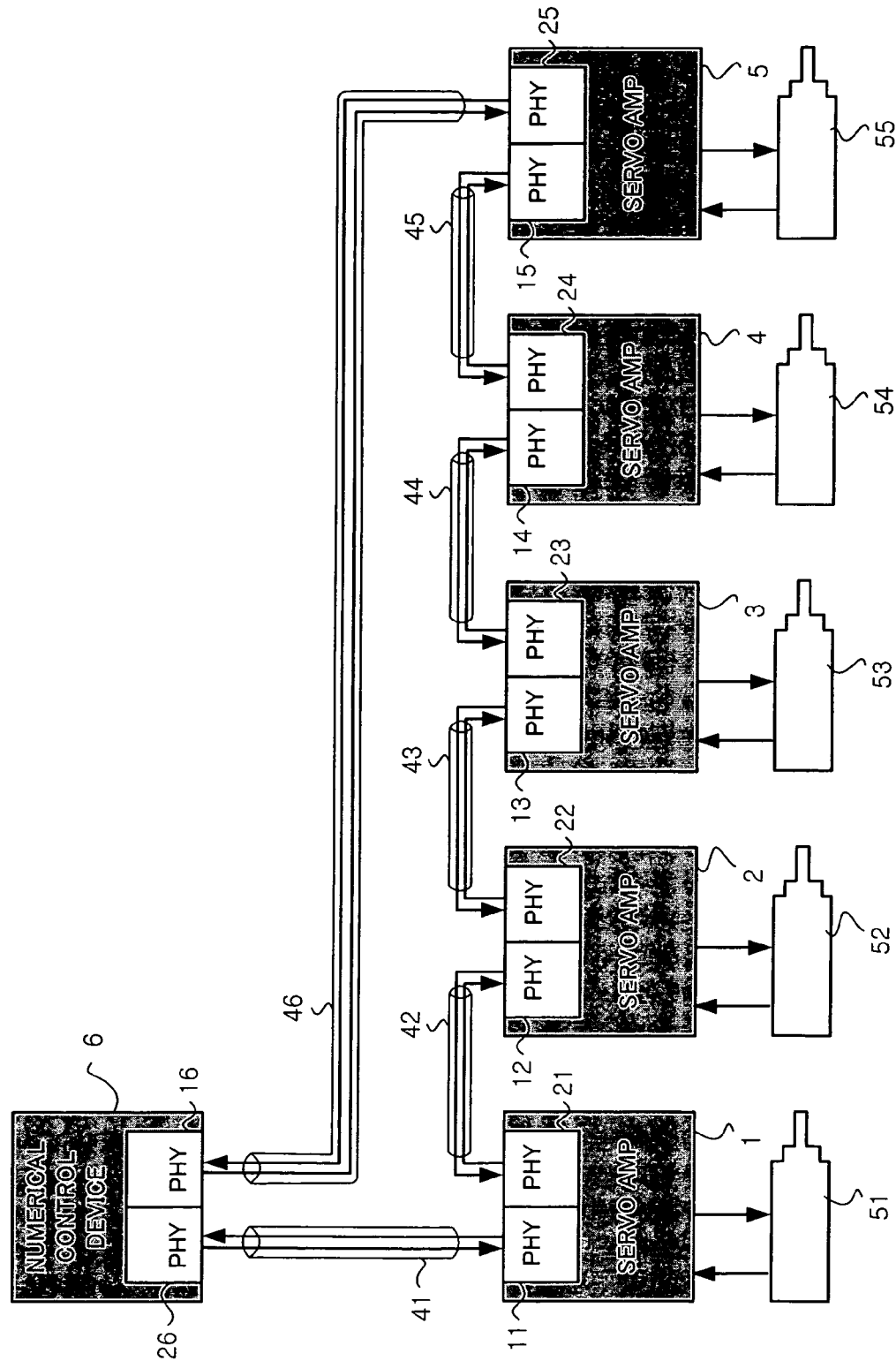
FIG. 3 is a block diagram illustrating a servomotor control system to which the present invention is applied.

The serial communication is implemented in a servomotor control system of FIG. 3. As similar devices are labeled with similar reference numerals as used in FIG. 1 and these descriptions are not repeated here. A physical layer 16 is attached to the NC device 6 and a bidirectional serial communication cable 46 connects the physical layer 16 to the physical layer 25 of the last servo amp 5. Thus, the NC device 6 and the servo amps 1, 2, 3, 4 and 5 are connected in a loop configuration. The physical layers 11, 21, 12, 22, 13, 23, 14, 24, 15, 25, 16 and 26 and a plurality of bidirectional serial communication cables 41, 42, 43, 44, 45 and 46 may be those which are encompassed in a gigabit Ethernet 1000Base-T or 1000Base-SX.

The 64 byte command data is split into two 32 byte halves. A 32 byte first half packet of command data is sent to the servo amps in a counterclockwise direction and a 32 byte second half packet of command data sent to the servo amps in a clockwise direction at the same time. In order to save time identifying an address, each second physical layer 21, 22, 23, 24 and 25 unconditionally starts to transfer the first half packet of command data to the adjacent node in a counterclockwise direction immediately after each first physical layer 11, 12, 13, 14 and 15 starts to receive the first half packet of command data. Also, each first physical layer 11, 12, 13, 14 and 15 unconditionally starts to transfer a second half packet of command data to the adjacent node in a clockwise direction immediately after each second physical layer 21, 22, 23, 24 and 25 starts to receive the second half packet of command data. The first half packet of command data and the second half packet of command data loop back to the NC device 6 at the same time. The 64 byte feedback data is also split into two 32 byte halves. Each second physical layer 21, 22, 23, 24 and 25 starts to send a first half packet of feedback data to the adjacent node in a counterclockwise direction after each first physical layer 11, 12, 13, 14 and 15 completes to receive the first half packet of command data packet and identifies an address. Also, each first physical layer 11, 12, 13, 14 and 15 starts to send a second half packet of feedback data to the adjacent node in a clockwise direction after each second physical layer 21, 22, 23, 24 and 25 completes to receive the second half packet of command data and identifies an address. The NC device 6 generates a series of command data packets in cycles of time $T_{cyc}$. The time $T_{cyc}$ is over two times as long as a maximum of time length Tp.

As shown in FIG. 4, at time t1, the physical layer 26 sends a first half packet of first command data to the physical layer 11 of the first servo amp 1 and the physical layer 16 sends a second half packet of first command data to the physical layer 25 of the last servo amp 5. The first command data packet is addressed to the first servo amp 1. After a delay of physical layer Td, the physical layer 11 starts to receive the first half packet of first command data and the physical layer 25 starts to receive the second half packet of first command data at time t2. At time t2, the physical layer 21 starts to transfer the first half packet of first command data to the second amp 2 and the physical layer 15 starts to transfer the second half packet of first command data to the fourth servo amp 4. After the physical layer 11 completes to receive the first half packet of first command data and identifies an address, the physical layer 21 of the first servo amp 1 starts to send a first half packet of first feedback data to the NC device 6 to the physical layer 12. The first half packet of first feedback data is sent to the NC device 6 through the latter servo amps 2, 3, 4 and 5 at time t3. After the physical layer 21 completes to receive the second half packet of first command data and identifies an address, the physical layer 11 of the first servo amp 1 starts to send a second half packet of first feedback data to the NC device 6 at time t4. The NC device 6 generates first, second, third, fourth and last command data packets in cycles of time $T_{cyc}$. The time $T_{cyc}$ is two times as long as a maximum of time Tp to prevent data collision. At time t5, the physical layer 26 sends a first half packet of last command data to the physical layer 11 of the first servo amp 1 and the physical layer 16 sends a second half packet of last command data to the physical layer 25 of the last servo amp 5. The last command data packet is addressed to the last servo amp 5. After the physical layer 25 completes to receive the second half packet of last command data and identifies an address, the physical layer 15 of the last servo amp 5 starts to send a first half packet of last feedback data to the physical layer 24, at time t6. The first half packet of last feedback data is sent to the NC device 6 through the former servo amps 4, 3, 2 and 1. After the physical layer 15 completes to receive the first half packet of last command data and identifies an address, the physical layer 25 of the last servo amp 5 starts to send a second half packet of last feedback data to the NC device 6, at time t7. At time t8, the NC device 6 completes to receive the first half packet of last feedback data and the second half packet of last feedback data. A total transmission time $T_{total}$ during which the servo amps 1, 2, 3, 4 and 5 complete to receive respective command data packets and the NC device 6 completes to receive feedback data packets from the servo amps 1, 2, 3, 4 and 5 is represented by the following equation:

$$T_{total}=(n+1)\times Td+n\times Tcyc \quad (2)$$

where n is a number of the servo amps, Td is a delay of physical layer, about 500 ns. As the gigabit Ethernet can transmit data at a rate of gigabit per second, $T_{cyc}$ is 512 ns. Therefore, a total transmission time $T_{total}$ about 5.56 μs.

The present invention is not intended to be limited to the disclosed form. It is clear that many improvements and variations are possible with reference to the above description. The illustrated embodiment was selected to explain the essence and practical application of the invention. The scope of the invention is defined by the attached claims.

The invention claimed is:

1. A communication control method between a numerical control device and a plurality of servomotors, comprises the steps of:

connecting the numerical control device to a plurality of servoamps of the plurality of servomotors in a loop configuration via bi-directional serial communication cables;

splitting command data in the numerical control device, outputting a first portion of command data to one of the plurality of servoamps from the numerical control device in a counter-clockwise direction and a second portion of command data to one of the plurality of servoamps from the numerical control device in a clockwise direction;

splitting feedback data in one of the plurality of servoamps;

transmitting a first portion of feedback data to the numerical control device in a counter-clockwise direction from the one of plurality of servoamps in response to the first portion of command data; and transmitting a second portion of data to the numerical control device from the one of the plurality of servoamps in a clockwise direction in response to the second portion of command data, whereby splitting command data and feedback data and transmitting the split portion of data in clockwise and counter-clockwise directions to a servoamp reduces total transmission time.

2. The method according to claim 1, wherein, in the step or splitting command data, command data is split into a first half and a second half.

3. The method according to claim 1, wherein, in the step of splitting feedback data, feedback data is split into a first half and a second half.

4. The method according to claim 1, wherein the command data comprises position command data.

5. The method according to claim 1, wherein the command data comprises velocity command data.

6. The method according to claim 1, wherein the command data comprises current command data.

7. A servomotor control system comprises:

a numerical control device;

a plurality of servomotors each comprising a servoamp; and a bi-directional serial communications cables for connecting the numerical control device to the physical layer of the numerical control device to the physical layer of the plurality of servoamps in a loop configuration;

wherein the numerical control device splits command data, sends a first portion command data to one of the plurality of servoamps from the numerical control device in a counter-clockwise direction and a second portion of command data to one of the plurality of servoamps from the numerical control device in a clockwise direction at the same time, splits feedback data to one of the plurality of servoamps, sends a first portion of feedback data to the numerical control device in a counter-clockwise direction from the one of plurality of servoamps in response to the first portion of command data and sends the second portion of feedback data to the numerical control device from one of the plurality of servoamps in a clockwise direction in response to the second half frame of command data, whereby splitting command data and feedback data and transmitting the split portion of data in clockwise and counter-clockwise directions to a servoamp reduces total transmission time.

* * * * *